Aug. 5, 1958   A. A. EMMERLING   2,845,795
DYNAMOMETER
Filed Nov. 30, 1954   3 Sheets-Sheet 1
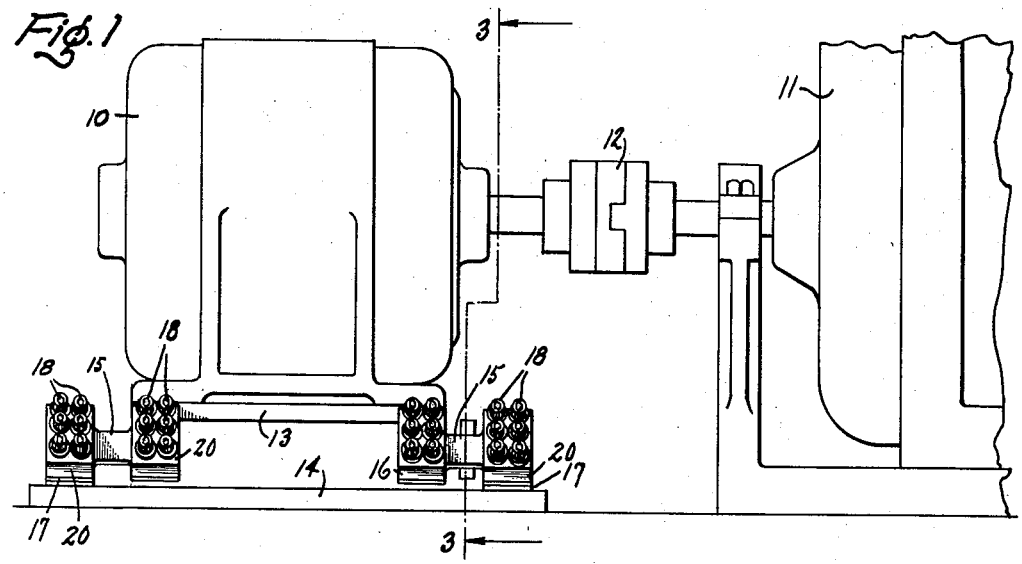
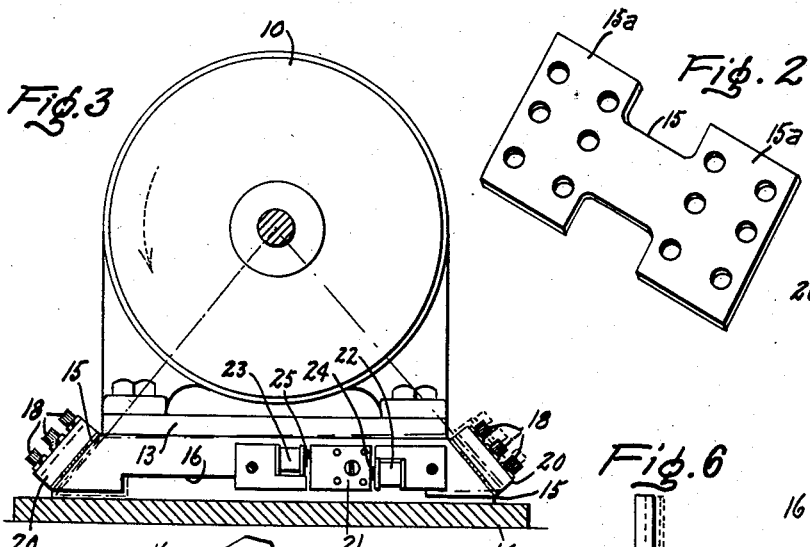
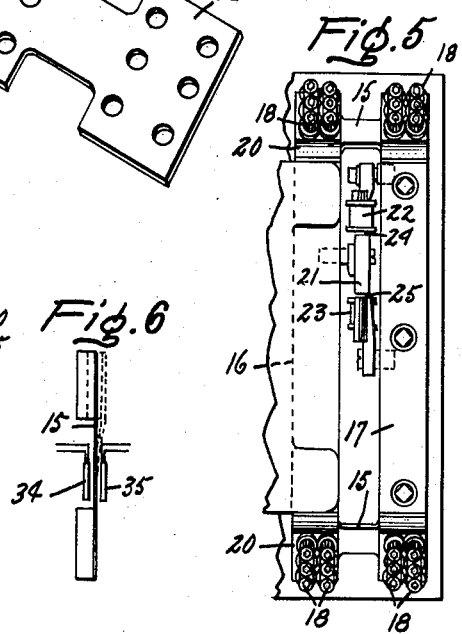
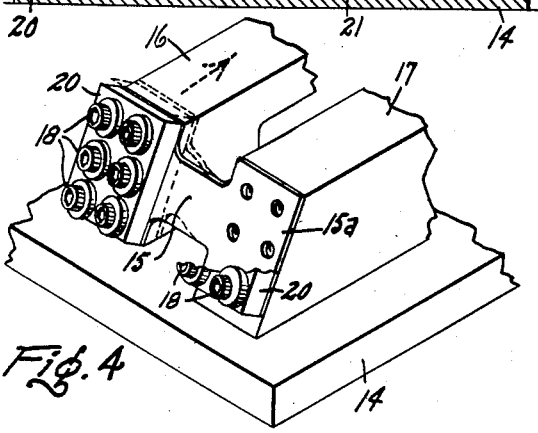
Inventor
Anson A. Emmerling
by Merton D. Moss
His Attorney Aug. 5, 1958     A. A. EMMERLING     2,845,795
DYNAMOMETER
Filed Nov. 30, 1954     3 Sheets-Sheet 2

Inventor:
Anson A. Emmerling
by Merton D. Morse
His Attorney

Aug. 5, 1958     A. A. EMMERLING     2,845,795
DYNAMOMETER
Filed Nov. 30, 1954     3 Sheets-Sheet 3
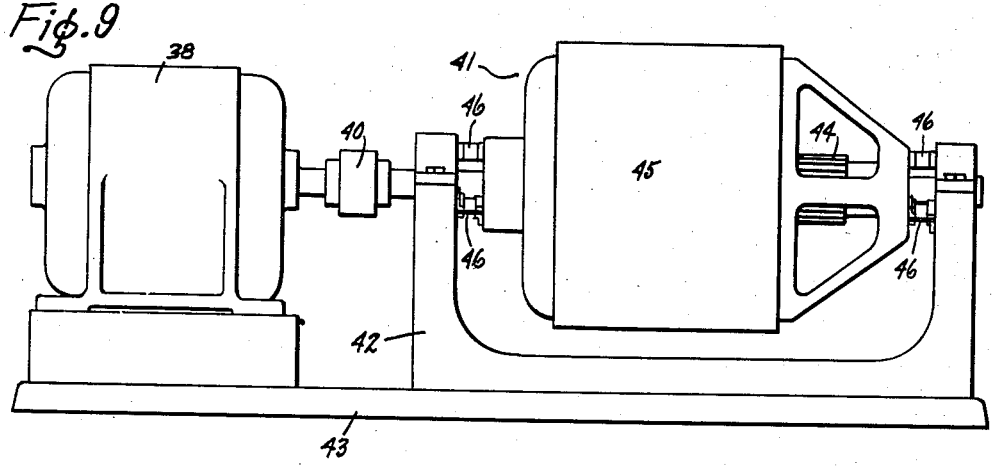
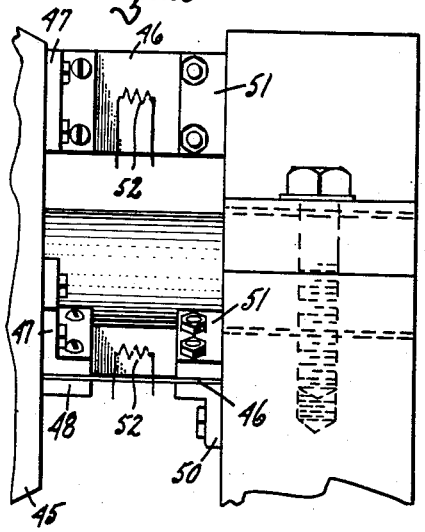
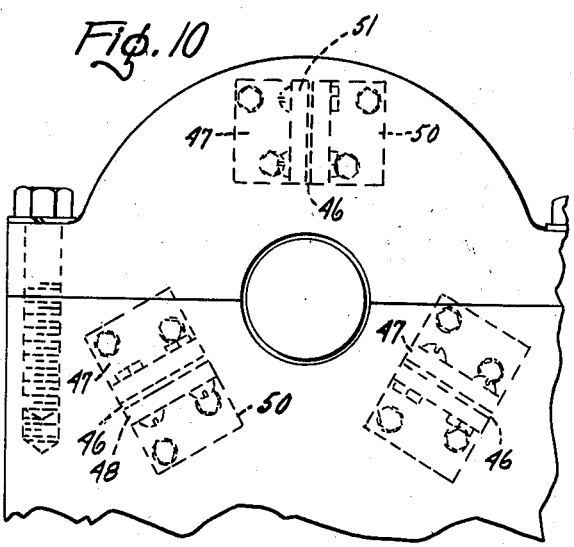
Inventor:
Anson A. Emmerling
by His Attorney United States Patent Office 2,845,795
Patented Aug. 5, 1958

2,845,795

DYNAMOMETER

Anson A. Emmerling, Albany, N. Y., assignor to General Electric Company, a corporation of New York Application November 30, 1954, Serial No. 472,063

5 Claims. (Cl. 73—136)

This invention relates to dynamometers for measuring the torque input or output of rotating machinery, and more particularly to a novel dynamometer for measuring that torque by means of the reaction torque of the stationary part of a rotating machine.

In the evaluation of rotating electrical machinery, it has been customary to measure the torque output or input of a machine under test by means of an electrical absorption dynamometer to which the test machine is mechanically coupled. An electrical absorption dynamometer employs a liberally designed direct current machine as either a motor or a generator, and the power delivered to or absorbed by the direct current machine is measured to indicate the torque input or output of the machine under test. The load and speed involved in the testing procedure must be within the rating of the dynamometer, and there is a maximum speed over which the dynamometer cannot safely run. Furthermore, evaluations at the rated torque output of a machine under test cannot be made if the machine has a speed rating higher than the rated speed of the absorption dynamometer. These limitations require that an ever increasing number of absorption dynamometers must be provided in order to test properly the various new designs of rotating electrical machinery.

Accordingly, a primary object of the present invention is to provide a dynamometer that avoids the above-mentioned limitations and is usable to test various sizes of rotating machines of widely differing speed ratings.

Another object is to provide a dynamometer in which the power absorbing means mechanically connected to the machine under test may be identical in construction with the test machine or, in the case of a motor under test, the power absorbing means may comprise a simple brake mechanism.

It is well known that in rotating machinery, the normally stationary part of the machine tends to rotate because of a force known as reaction torque that is directly related in magnitude to the torque input or output of the rotating part of the machine. In a generator, the reaction torque causes the stationary portion of the machine to tend to rotate in the same direction as the rotating portion, while in a motor the stationary portion tends to rotate in a direction opposite to that of the rotating portion. In the present invention, it is the reaction torque that is measured, and the power delivered or absorbed by the rotating part of the machine is merely disposed of by some convenient means. In one embodiment of the invention, the machine, whose torque input or output is to be measured, it mounted above a base by a spring suspension. The spring suspension comprises a plurality of cantilever beams so designed and mounted as to support the weight of the rotating machine without substantial bending, but to permit the normally stationary portion of the machine to rotate in accordance with the reaction torque of the machine. Motion sensing elements are located between the mounting means and the base to measure the amount of rotation of the normally stationary part of the machine.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawings in which:

Fig. 1 is a view in elevation of a dynamometer embodying the invention;

Fig. 2 is an enlarged perspective view of a cantilever beam utilized in the invention;

Fig. 3 is a vertical sectional view taken on the line 3—3 of Fig. 1;

Fig. 4 is an enlarged perspective view of a cantilever beam showing its mounting and operation;

Fig. 5 is a fragmentary plan view showing means for detecting the reaction torque of the stationary portion of the machine under test;

Fig. 6 is a diagrammatic view showing another means for detecting the reaction torque;

Fig. 9 is a view in elevation of a modification of the invention;

Fig. 10 is an end view of the modification of Fig. 9;

Fig. 11 is a perspective view of a cantilever beam used in the modification of Fig. 9; and Fig. 12 is an enlarged fragmentary view of the device shown in Fig. 9.

Figure 7:
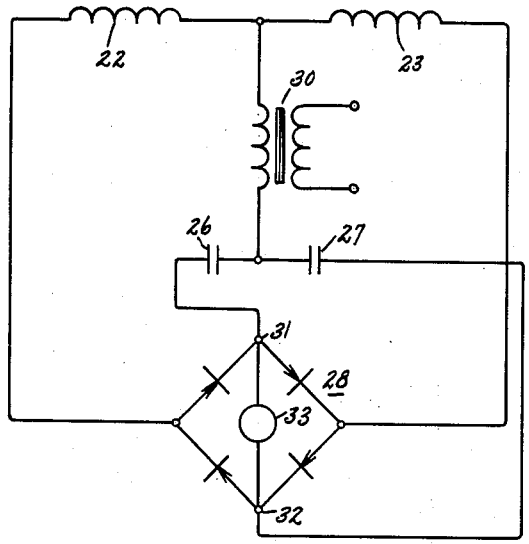
Fig. 7 is a diagram showing a typical electrical circuit that may be utilized with the detecting means shown in Fig. 3.

For purposes of explanation, it will be assumed in the following description that the machine under test is a motor whose torque output is to be measured. It is understood, of course, that the machine under test may be a generator whose torque input is to be measured, and the dynamometer of the invention is equally applicable to either application.

Referring now to the drawings, Fig. 1 illustrates a typical arrangement for evaluating the torque input or output of a rotating electrical machine, in this case, a motor 10, which is connected to a power absorbing machine 11 through a conventional coupling 12. The only purpose of the machine 11 is to absorb the mechanical power produced by the motor 10 under test, and it may be identical in construction to the machine under test. Alternatively, the power absorbing machine 11 may be replaced by a conventional mechanism such as an eddy current brake or a Prony brake. Of course, if the machine under test is a generator, the power absorbing machine 11 is replaced by a motor in order to turn the rotor of the generator.

The motor 10 under test is secured in a conventional manner to a bed plate 13, and the motor 10 and bed plate 13 are so mounted with respect to an immovable base 14 that the weight of the motor and bed plate are sustained and yet they are capable of rotation in response to the reaction torque caused by rotation of the rotor of the motor. In accordance with the invention, the supporting means interposed between the bed plate 13 and the base 14 comprises a plurality of flat cantilever beams or leaf springs 15 made of tool steel or other similar material. As shown in Fig. 2, each cantilever beam 15 may have extended end portions 15a to provide convenient mounting areas. Thus, the beams appear to be of flattened H shape.

It is seen in Fig. 3 that the bed plate 13 on which the motor is supported is mounted on cross bars 16, there being a cross bar 16 located under each end of the bed plate. The cantilever beams 15 each have one end portion 15a fixed to an end of a cross bar 16, and the other end of each beam is secured to an end of a supporting bar 17, with a supporting bar 17 being mounted on the base 14 outside each of the two cross bars 16 (Fig. 1).

Referring now to Fig. 4, it is seen that the ends of the bars 16 and 17 are chamfered and the cantilever beams affixed thereto by convenient means such as by bolts 18 extending through plates 20, through the ends 15a of the beams and into the ends of the bars 16 and 17. The cantilever beams 15 are so secured to the ends of the bars 16 and 17 that the supporting bar 16 does not contact the immovable base 14. Thus, the motor 10, the base plate 13, and the supporting bar 16 are supported in true cantilever fashion by the leaf springs or beams 15.

If the machine being tested is mechanically coupled to another rotating machine, as in the case of a generator under test or a motor coupled to a power absorbing machine, it is preferred that the chamfers on the ends of the bars 16 and 17 are cut at an angle such that the planes in which the flat cantilever beams 15 lie include the axis of rotation of the rotor of the machine under test, as shown in Fig. 3. In the case of a test machine that is not mechanically coupled to another machine, as when the mechanical power generated by a motor under test is absorbed by a brake mechanism, it is not necessary that the plane bear this relationship, but only that they are parallel to the axis of rotation of the test machine rotor. Of course, the planes may include the axis of rotation of the machine rotor in both cases, if desired. Because of this novel method of mounting the rotating machine, its weight is firmly supported by the cantilever beams, while the resilience of the beams permits rotational movement of the normally stationary portion of the machine and the bed plate on which the machine is mounted. Thus, if the rotor of the motor 10 is turning in a clockwise direction, a reaction torque is produced which acts on the fixed portion of the motor and tends to cause it to rotate in a counterclockwise direction. The reaction torque causes the cantilever beams 15 to flex and the cross bars 16 assume substantially the position shown in broken lines in Fig. 3. Fig. 4 shows in broken lines the configuration of a cantilever beam 15 as the reaction torque causes the cross bar 16 to move in the direction shown by the arrow. It is understood that two of the cantilever beams will be bent inwardly, while the other two will be bent outwardly, but all will assume a shape similar to the one illustrated.

It is pointed out that the dimensions of the cantilever beams 15, and the type of material from which they are constructed may vary according to the application of the dynamometer, and due regard must be given to the weight of the rotating electrical machine that will be supported by the beams. It has been found in practice that four cantilever beams constructed of tool steel 1/32" thick and having a central portion between the end portions approximately 1" square will support a motor weighing up to 150 lbs., and will function properly when supporting smaller machines.

Various means may be employed to measure the motion or displacement of those portions of the equipment that respond to the reaction torque. One convenient means for measuring this quantity is illustrated in Fig. 5 and comprises a variable inductance strain gage. The strain gage is of conventional, commercially available type and comprises an armature 21 secured to one of the cross bars 16, and two coils 22 and 23 secured to the adjacent supporting bar 17. The operation of such a strain gage is based on the fact that the inductance of the coils 22 and 23 is changed in response to movement of armature 21 which varies the air gaps between the ends of the armature and the coils. For example, if the reaction torque is such as to cause the motor supporting bar 16 to move upwardly, as seen in Fig. 5, the armature 21 will move closer to the coil 22 and farther away from the coil 23, thus decreasing the air gap 24 and increasing the air gap 25. This change in air gap width causes the inductances of the two coils to change in opposite directions by an amount that is proportional to the change in air gap width.

Fig. 7 illustrates a typical circuit into which the strain gage coils may be connected to give an indication of the torque input or output of the machine under test. The circuit is of conventional well known type, in which the strain gage coils 22 and 23 comprise two arms of an A.-C. bridge. The other two arms comprise capacitors 26 and 27 of equal value, connected to the remainder of the bridge through a rectifier circuit 28. The bridge may be energized from the secondary winding of a transformer 30 connected between opposite corners of the bridge between the inductances 22 and 23 and the capacitors 26 and 27, and the transformer primary winding may be connected to a conventional source of alternating current (not shown). When the circuit is energized, current flows through the coil inductances 22 and 23 and through the capacitors 26 and 27. If the inductances of the coils 22 and 23 are equal, the voltage drops across the inductances 22 and 23 are equal, the voltage drops across the capacitors 26 and 27 are equal, the opposite points 31 and 32 of the rectifier bridge 28 are at equal D.-C. potentials. Therefore, no current will flow through a D.-C. ammeter 33 connected between the points 31 and 32. However, if the armature of the strain gage is moved so that the inductance of one of the gage coils is increased, and the inductance of the other is decreased, then the voltage drops across the inductances 22 and 23 will be unequal and the voltage drops across the capacitors 26 and 27 will be unequal, and current will flow through the ammeter 31. For example, if the inductance of gage coil 22 is less than that of gage coil 23, the voltage drop across inductance 23 will be larger than that across inductance 22. The point 31 will be at a higher D.-C. potential than point 32 and current will flow downwardly through ammeter 33. Conversely, if the inductance of coil 23 is smaller than that of coil 22, the voltage drop across coil 22 will be larger than that across coil 23. Therefore, the point 32 will be at a higher D.-C. potential than point 31 and current will flow upwardly through ammeter 33. The current through ammeter 33 is proportional to the difference in inductance between gage coils 22 and 23, which in turn is proportional to the amount of rotation of the machine mount relative to the immovable base in response to the reaction torque of the machine under test. Thus, the reading of the ammeter 33 is indicative of the torque input or output of the rotating machine under test, and suitable calibration curves may be made to convert the ammeter reading into terms of torque input or output. Of course, a D. C. voltmeter may be used to measure the potential difference between the points 31 and 32 instead of an ammeter, or a recording device may be used to provide a permanent record of the torque measurements. It has been found particularly desirable to use a recording device in conjunction with the invention in order to provide a record of transient torques, which have not been observable in the dynamometers previously known.

Conventional resistance strain gages of a type well known in the art may be utilized to provide a measure of the torque of the machine under test, as shown diagrammatically in Fig. 6. The strain gages may be cemented to one or more of the cantilever beams or leaf springs 15, so that when the beams 15 are flexed by the reaction torque of the machine under test, the strain gages are placed under compression or tension. Preferably, two strain gages 34 and 35 are cemented on opposite sides of a cantilever beam 15 in back to back relationship, so that, when the beam is deflected as shown in broken lines, the strain gage 34 is placed under tension and the gage 35 is placed under compression. Thus, the resistance of the gage 34 increases while the resistance of the gage 35 decreases. Furthermore, by using two strain gages on a cantilever beam and connecting them in a bridge circuit as will be hereafter described, automatic temperature compensation may be effected. Although satisfactory operation may be obtained by using strain gages on only one cantilever beam, the use of the gages on two beams results in increased sensitivity.

Figure 8:
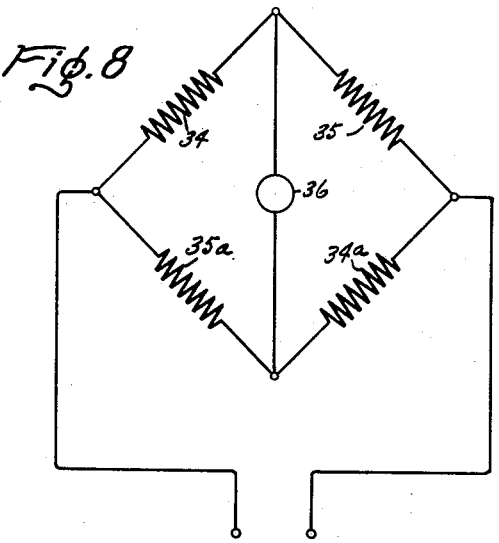
Fig. 8 is a diagram showing a typical electrical circuit that may be used with the detecting means of Fig. 6.

Fig. 8 shows a typical bridge circuit into which the resistance strain gages may be connected. The strain gages 34 and 35 are connected as adjacent arms of the bridge, and the other arms of the bridge may comprise similar gages 34a and 35a mounted on another cantilever beam. If only one cantilever beam is provided with strain gages, the resistance 34a and 35a may be replaced by "dummy" resistances having equal value. It is pointed out that if strain gages 34 and 35 are mounted on one cantilever beam and gages 34a and 35a are mounted on another beam, care must be exercised in connecting the gages in the bridge circuit. It is necessary that those gages whose resistances change in the same direction due to flexure of the cantilever beams are connected in opposite arms of the bridge rather than in adjacent arms. A voltage source (not shown) may be connected to the bridge between resistances 34 and 35a and between resistances 34a and 35, and a high input resistance voltmeter 36 may be connected between the remaining diagonal points.

In operation, when the cantilever beams on which the strain gages are mounted are not flexed, the resistances 34 and 35 are equal and the resistances 34a and 35a are equal. Therefore, no potential difference exists across the voltmeter 36. If now the machine under test is energized, and its reaction torque causes flexure of the cantilever beams on which the strain gages are mounted, two of the resistances comprising the bridge decrease in value and the remaining two increase in value. For example, if the strain gages are so mounted that the resistances 34 and 34a decrease in value and the resistances 35 and 35a increase in value, a voltage difference will exist across the voltmeter 36. Thus, the reading of the voltmeter will be an indication of the degree of strain under which the gages have been placed, and hence an indication of the reaction torque and the input or output torque of the electrical machine under test. Of course, the voltmeter 36 may be replaced by a recording device, many of which are well known in the art, in order to provide a permanent record of the torque of the machine under test.

Figs. 9 through 12 illustrate a modification that applies the novel torque measuring means of the invention to a conventional absorption dynamometer. Referring now to Fig. 9, a rotating machine 38 under test is connected through a conventional coupling 40 to a dynamometer 41. The dynamometer 41 is similar to a conventional absorption dynamometer and includes a yoke 42 that supports the remainder of the machine. Both the machine 38 under test and the dynamometer are supported on a firm base 43. The dynamometer itself is a liberally designed D. C. machine that is capable of operating either as a motor or a generator, and comprises a rotor 44 and a normally stationary frame 45 containing the stator. In the method of operation heretofore known, both the rotor 44 and frame 45 are supported for rotation in bearings in the upright portions of the yoke 42. As the rotor 44 of the machine rotates, it produces a reaction torque that causes the frame 45 to rotate in the same direction as the rotor when the machine is operating as a generator, or in the opposite direction when the machine is operating as a motor. In either case, the rotation of the frame is resisted by weights attached to arms extending out from the sides of the frame, and the foot-pounds required to maintain the frame stationary is a measure of the input or output torque of the dynamometer, and hence an indication of the input or output torque of the machine coupled to the dynamometer.

In the present case, neither the rotor 44 nor the frame 45 is rotatably supported by the yoke 42. The rotor is supported by means of the usual bearings within the frame, and the frame 45 is supported at each end from the upright portions of the yoke by means of cantilever beams or springs 46. Preferably, thereare three such cantilever beams 46 at each end of the stator equally spaced about the rotor, as best seen in Fig. 10, and the planes of the beams include the axis of rotation of the rotor 44. Thus the machine is firmly supported and yet the frame may rotate somewhat in response to the reaction torque.

Referring to Fig. 11, it is seen that each cantilever beam 46 is a substantially flat rectangular member that may conveniently be constructed of tool steel or a similar material. The beams 46 differ from the beams 15 previously described primarily in that the beams 46 do not have extended end portions, but the purpose and function of the beams 15 and 46 is the same.

As best seen in Fig. 11, one end of each cantilever beam 46 is secured to the frame 45 of the dynamometer by means of screws extending through a right-angle bracket 47, the beam 46, and a retaining plate 48. The brackets 47 may be attached to the frame 45 by convenient means such as screws. The other end of each beam 46 is similarly secured to the upright portion of the yoke by means of a bracket 50 and retaining plate 51.

As the rotor 44 of the dynamometer rotates to transmit mechanical power to the machine 38 under test or to absorb power from the machine under test, a reaction torque is produced that tends to rotate the normally stationary frame 45 of the dynamometer and thus flexes the cantilever beams 46 that support the frame 45 from the yoke 42. The motion of the frame 45 in response to the reaction torque may most easily be detected in the present case by means of resistance strain gages 52 cemented in the usual fashion to the cantilever beams 46. As previously mentioned, it is preferable that two gages be cemented in back-to-back relationship on a beam, and it is preferred that two beams be provided with strain gages. The gages may be connected in a circuit such as that shown in Fig. 8 to provide an output signal whose magnitude is an indication of the torque input or output of the dynamometer 41, and hence of the torque output or input of the machine 38 under test.

Of course, many changes and modifications may be made in the embodiments of the invention shown and described. For example, in order to vary the angular positions of the cantilever beams and cause their planes to include the axis of rotation of the machine under test regardless of the size of the machine, wedges of the proper angle may be interposed between the ends of the beams and the bars to which they are secured. Complementary wedges may be placed outside the beams to provide surfaces parallel to the ends of the bars so that the securing bolts will seat properly. Various other modifications may be made, and it is contemplated by the appended claims to cover any such modifications as fall within the true spirit and scope of the invention.

What I claim as new and deside to secure by Letters Patent of the United States is:

1. In a dynamometer for measuring the torque input or output of a rotating machine, the combination of a base and a plurality of substantially flat cantilever elements interposed between said base and the frame of said machine for allowing rotational movement of said frame, each of said cantilever elements having its major flexing surface extending in the direction of the axis of rotation whereby they are flexed in response to reactive torque, the points of attachment to the base and frame of each of said cantilever elements lying on a line parallel to the axis of rotation.

2. A dynamometer for measuring the torque input or output of a rotating machine comprising a base, a plurality of flat cantilever beams interposed between said base and the frame of said machine for allowing rotational movement of said frame, each of said flat cantilever beams having its major flexing surface extending in the direction of the axis of rotation, the points of attachment to the base and frame of each of said cantilever elements lying on a line parallel to the axis of rotation, and means for detecting motion between said base and said frame.

3. A dynamometer for measuring the torque input or output of a rotating machine comprising a base, a plurality of flat elongated cantilever beams interposed between said base and the frame of said machine for allowing rotational movement of said frame, each of said cantilever beams having its elongated major flexing surface extended in the direction of the axis of rotation, the points of attachment to the base and frame of each of said cantilever elements lying on a line parallel to the axis of rotation, and resistance strain gage means mounted on at least one of said cantilever beams for detecting flexure of said beam.

4. A dynamometer comprising mounting means for a rotating machine to be tested, a base, a plurality of elongated substantially flat cantilever beams interposed between said base and said mounting means for allowing rotational movement of said mounting means, each of said cantilever beams lying in a plane wherein its major flexing surface extends in the direction of the axis of rotation, the points of attachment to the base and frame of each of said cantilever elements lying on a line parallel to the axis of rotation, and motion sensitive means mounted between said mounting means and said base.

5. A dynamometer for measuring the torque input or output of a rotating machine comprising a mount, a plurality of cantilever beams connected between the frame of said machine and said mount, said beams being equally spaced about the axis of rotation of said machine and lying in planes that include said axis, the major flexing surfaces thereof extending in the direction of the axis of rotation, the points of attachment to the base and frame of each of said cantilever elements lying on a line parallel to the axis of rotation, and means mounted on at least one of said cantilever beams for detecting flexure of said beams.

References Cited in the file of this patent
UNITED STATES PATENTS

| | | |
|---|---|---|
| 1,000,494 | Clement | Aug. 15, 1911 |
| 2,329,121 | Lamberger | Sept. 7, 1943 |
| 2,362,308 | Roberts | Nov. 7, 1944 |
| 2,385,005 | Langer | Sept. 18, 1945 |
| 2,389,361 | Hagg et al. | Nov. 20, 1945 |
| 2,484,761 | Stock | Oct. 11, 1949 |
| 2,511,178 | Roters | June 13, 1950 |
| 2,623,385 | Jamieson | Dec. 30, 1952 |